(12) United States Patent
Bosse et al.

(10) Patent No.: US 12,123,720 B1
(45) Date of Patent: Oct. 22, 2024

(54) DATA ESTIMATION IN ASYNCHRONOUS SYSTEMS

(71) Applicant: Zoox, Inc., Foster City, CA (US)

(72) Inventors: Michael Carsten Bosse, Templeton, CA (US); Till Kroeger, Chicago, IL (US); Brice Rebsamen, Aix-en-Provence (FR)

(73) Assignee: Zoox, Inc., Foster City, CA (US)

( * ) Notice: Subject to any disclaimer, the term of this patent is extended or adjusted under 35 U.S.C. 154(b) by 268 days.

(21) Appl. No.: 17/900,453

(22) Filed: Aug. 31, 2022

(51) Int. Cl.
*G01C 21/16* (2006.01)
*B60W 60/00* (2020.01)
*G01S 19/49* (2010.01)

(52) U.S. Cl.
CPC ............ *G01C 21/165* (2013.01); *G01S 19/49* (2013.01); *B60W 60/001* (2020.02)

(58) Field of Classification Search
CPC ..... G01C 21/165; G01S 19/49; B60W 60/001
See application file for complete search history.

(56) References Cited

U.S. PATENT DOCUMENTS 11,131,752 B2 * 9/2021 Yang ................. G01S 17/89
2016/0364619 A1 * 12/2016 Ogata ................. G06T 7/50

FOREIGN PATENT DOCUMENTS

CN 111256662 B * 6/2022 ............. G01C 11/02

OTHER PUBLICATIONS

English translation of Miyamoto (CN 111256662) (Year: 2022).*

* cited by examiner

*Primary Examiner* — James M McPherson
*Assistant Examiner* — Kyle J Kingsland
(74) *Attorney, Agent, or Firm* — Lee & Hayes P.C.

(57) ABSTRACT

Techniques for estimating vehicle poses are described herein. A pose may refer to the inertial pose or position of a vehicle. The pose of the vehicle may be used to determine a position of the vehicle in an environment, for determining a trajectory of the vehicle through the environment, or the like. In examples, a pose determination component of an autonomous vehicle can determine a pose at a frequency that is different from other systems on the vehicle and/or that is not synchronized with those systems. The techniques described herein allow for estimating poses at any measurement time, e.g., to determine a pose at a measurement time at which other data is measured, generated, or the like.

20 Claims, 7 Drawing Sheets

DATA ESTIMATION IN ASYNCHRONOUS SYSTEMS

BACKGROUND

Autonomous vehicles and other complex autonomous systems use various methods, apparatus, and systems to perform operations. For instance, some autonomous vehicles include sensing systems for generating sensor data about the vehicle and/or about an environment in which the vehicle is travelling, computing systems for identifying objects from the sensor data, computing systems for generating a path through the environment relative to the identified objects, and/or numerous other systems. Such systems are often configured to receive, generate, output, and/or otherwise interact with data at varied frequencies and for different purposes. Moreover, the systems are often functioning independently, e.g., without any synchronization. Because of the varied frequency at which the systems interact with this data and/or the asynchronicity of the systems, error may be introduced into the processes performed by the various systems, which can lead to less optimal functioning of the autonomous vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
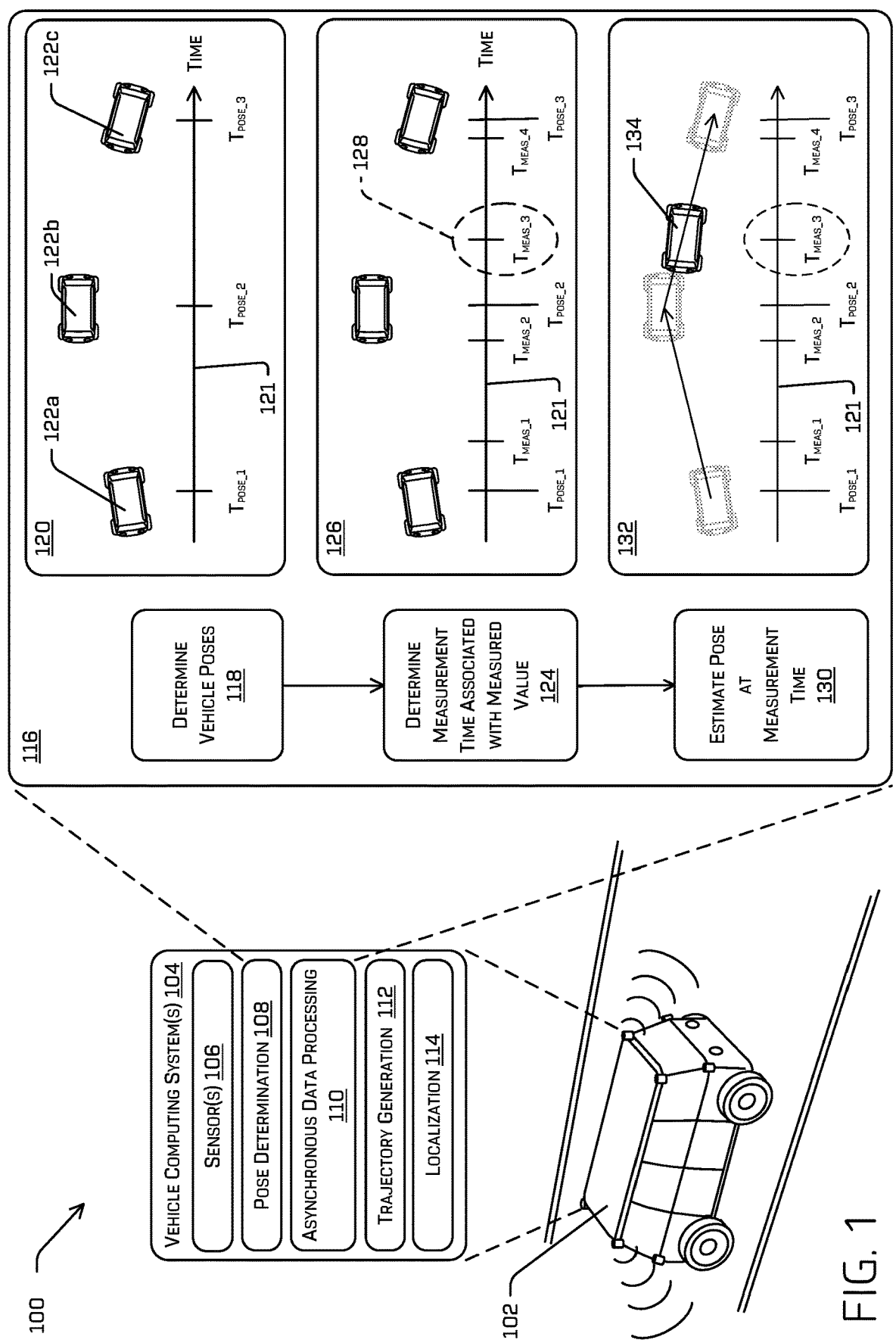
FIG. 1 is a schematic representation and a textual and pictorial flowchart illustrating example systems and techniques for processing asynchronous data in an autonomous vehicle system, as described herein.

Techniques described herein are directed to estimating data from known, e.g., previously calculated data. For example, in implementations described herein, techniques may be used to estimate machine poses at times between poses determined by a pose determination computing system. For instance, the pose determination computing system may generate poses at a relatively low frequency, e.g., at predetermined pose times, but certain (other) computing systems may benefit from vehicle poses at other times, e.g., times between the pose times. In at least some examples, the techniques described herein can estimate a pose at a time corresponding to a time at which certain measurements are made. Although many systems may benefit from the techniques described herein, an example system that implements the techniques of this disclosure may include an autonomous vehicle having multiple sensors, e.g., sensors of different modalities and/or configured to generate data at various times and/or at various frequencies, and/or having multiple computing systems, e.g., generating data at various times and/or at various frequencies.

In examples described herein, pose estimation techniques herein can be used to determine vehicle poses at times between pose generation times. For example, a pose of a vehicle at a time corresponding to a time at which sensor data is captured, e.g., a measurement time, may allow a localization system to better determine an actual location of the vehicle, e.g., as compared to using a pose that was determined at some non-corresponding time.

In example implementations, a pose can be estimated at a measurement time using vehicle poses that are close in time to the measurement time. In at least one example, the techniques described herein can determine an estimated pose as an offset of a vehicle pose, e.g., of a single vehicle pose. For instance, the estimated pose may be an extrapolation of a vehicle pose that is closest in time to the measurement time, that immediately precedes the measurement time, that immediately follows the measurement time, that has a confidence value, and/or the like.

In other examples, the techniques described herein may determine an estimated pose based on an interpolation of two or more poses. For instance, techniques described herein can determine a linear interpolation of a first pose immediately preceding the measurement time and a second pose immediately after the measurement time. In other examples, interpolations other than linear interpolations, e.g., higher-order interpolations, spline interpolations, and/or the like, may be used.

In some examples, the techniques described herein can determine an estimated pose based on errors associated with the vehicle poses. For instance, techniques described herein include interpolating pose errors over a time interval including the measurement time. For instance, the vehicle pose may be determined based on a smooth pose and an interpolation of errors between determined vehicle poses. Using error interpolation as detailed herein may provide improvements in pose estimation, particularly for systems with high trajectory dynamics.

In some examples, the estimated pose may be an intermediate pose, e.g., between two poses calculated using a global solver. In examples, the global solver can solve for new poses and re-solve for previous poses, e.g., within a window of time. The estimated pose, e.g., associated with a measurement as described herein, may be used as an additional constraint or anchor point for the measurement value in the global solver. That is, the global solver may solve and re-solve for global poses using a number of factors, constraints, and the like. The estimated poses determined according to aspects of this disclosure are used to attach a factor in the graph used by the global solver, e.g., by associating measurement data with some estimated state, to fully solve for poses again. Thus, functioning of a global solver may be enhanced though pose estimation according to techniques described herein. In examples, the global solver may be performed using a windowed filter, where a number of the poses within a lookback window of a specific time are re-solved, including as more data becomes available.

In other examples, the techniques described herein may generate estimates for objects in an environment. For example, while an autonomous vehicle traverses through an environment, sensors on the vehicle will generate sensor data at varied measurement times. In some instances, sensor data may be used for localization, e.g., by comparing sensor data associated with a localization object, like a building or other structure, with localization templates including the localization object. In some instances, localization may be done at some predetermined frequency. However, sensor data may be received at instances offset from those times at which localization is performed. The techniques described herein can be used to determine an estimated pose of the vehicle at the measurement time, to provide localization at a time corresponding to the measurement time associated with the measured data.

Techniques described herein are directed to improving data estimation in a complex computing system, such as an autonomous vehicle. Techniques described herein can allow for improved localization of the vehicle, improved trajectory determination and implementation on the vehicle, or the like. Techniques described herein may allow for better estimation techniques that could allow for conventional computing systems to operate less frequently, e.g., because the estimation techniques detailed herein are robust. That is, techniques described herein provide a technological improvement, because they may allow for more complex and resource intensive processes to be performed less frequently. In addition, by allowing for more accurate data estimation, the techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system that uses radar data to navigate an environment may benefit from the radar data processing techniques described. By way of non-limiting example, techniques described herein may be used on aircrafts, e.g., to identify other aircraft and/or moving objects. Moreover, non-autonomous vehicles could also benefit from techniques described herein, e.g., for collision detection and/or avoidance systems.

FIGS. 1-7 provide additional details associated with techniques described herein. More specifically, FIG. 1 is a schematic illustration showing an example scenario 100 in which a vehicle 102 is driving on a road surface. For illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. Additional details associated with the vehicle 102 are described below. However, the vehicle 102 is merely an example, and the systems and methods described herein can be incorporated into any ground-borne, airborne, or waterborne vehicle, including those ranging from vehicles that need to be manually controlled by a driver at all times, to those that are partially or fully autonomously controlled. In additional implementations, techniques described herein may be useful in settings other than vehicles. The techniques described in this specification may be useful in many different applications in which sensor data is used to determine information about objects in an environment.

The vehicle 102 includes one or more vehicle computing system(s) 104 including one or more sensor(s) 106, a pose determination component, an asynchronous data processing component 110, a trajectory generation component 112, and a localization component 114.

Without limitation, the sensor(s) 106 may be one or more of radar sensors, LiDAR sensors, imaging sensors (e.g., cameras), time-of-flight sensors, sonar sensors, thermal imaging devices, or any other sensor modalities. The vehicle 102 may include any number of sensors, with any number of different modalities. In examples, the sensor(s) 106 may be disposed to generate sensor data about an environment of the vehicle 102, e.g., about objects in the environment vehicle including but not limited to static objects, dynamic objects, vehicles, pedestrians, bicyclists, buildings or any other detectable object(s). In some examples, the sensor(s) 106 can be arranged to provide for sensing objects at 360-degrees relative to the vehicle 102.

The sensor(s) 106 can also include sensor modalities configured to generate sensor data about the vehicle. For instance, the sensor(s) 106 can include one or more inertial measurement units (IMUs), wheel encoders, steering angle sensors, accelerometers, gyroscopes, Global Position System (GPS) devices, or the like.

The sensor(s) 106 include multiple sensors, including multiple sensor modalities. Accordingly, the sensor(s) 106 may generate sensor data of varying types and/or at varying frequencies, e.g., depending on specific attributes of the sensor(s) 106. For example, and without limitation, an IMU may generate data at a higher frequency than a LiDAR sensor. Moreover, the sensor(s) 106 may not be configured to synchronize their outputs. For instance, each instance of the IMU data may have a measurement time different from each instance of the LiDAR data. Aspects of this disclosure may be useful to estimate data between instances of data generation, e.g., regardless of the differing frequencies and/or asynchronicity.

The pose determination component 108 includes functionality to determine a pose of the vehicle 102. For example, and without limitation, the pose determination component 108 and receive data from one or more of the sensors 106 and based on the sensor data, determine a pose of the vehicle 102 in real time, or near real-time. As used herein, a vehicle pose may include one or more of an X-coordinate, a Y-coordinate, a Z-coordinate (or any coordinate of any coordinate system, including polar or cylindrical coordinate systems, or the like), a yaw value, a roll value, a pitch value (e.g., an angle value), a rate (e.g., a velocity) an altitude, or the like. In some examples, the pose determination component 108 may receive IMU data, wheel speed data, steering angle measurements, and/or other data from the sensor(s) 106 to generate a current pose of the vehicle 102 in examples of this disclosure, the pose determination component 108 may generate vehicle pose data at a predetermined frequency, e.g., on the order of about 5 Hz. The pose determination component 108 may include a global solver or similar functioning that, in addition to solving a next pose at the predetermined frequency, re-solves previously-solved poses. Thus, for example, when determining a next estimate for a pose, the pose determination component 108 can re-solve the last-determined pose, as well as any number of previously-determined poses. In some examples, the pose determination component 108 can include a windowed solver that solves all poses in a predetermined window of time. As will be appreciated, because each pose is an estimation based on one or more previous poses, re-solving for one pose may result in a cascade of changes throughout all later-determined (including yet-to-be determined) poses.

The asynchronous data processing component 110 includes functionality to estimate data based on data from multiple systems, including but not limited to the pose determination component 108 and the sensors 106. For example, the asynchronous data processing component 110 may estimate data values, e.g., vehicle poses, at times between instances in which the data is typically generated. An example process 116 illustrates example techniques performed by the pose determination component 108 and/or the asynchronous data processing component 110.

More specifically, the process 116 includes, at an operation 118, determining vehicle poses. The operation 118 may be performed by the pose determination component 108, generally as described above. An example 120 accompanying the operation 118 includes a timeline 121 on which is schematically illustrated a first vehicle pose 122a at a first pose time $T_{pose1}$, a second vehicle pose 122b at a second pose time, $T_{pose2}$, and a third vehicle pose 122c at a third pose time, $T_{pose3}$. (Collectively, the first vehicle pose 122a, the second vehicle pose 122b, and the third vehicle pose 122c, as well as additional and/or other vehicle poses not represented in FIG. 1, may be referred to as "the vehicle poses 122.") In examples, the pose determination component 108 generates the vehicle poses 122 at a predetermined frequency, e.g. at a time interval ΔT, corresponding to the time between $T_{pose1}$ and $T_{pose2}$, $T_{pose2}$ and $T_{pose3}$, or the like. In examples, the time interval may be on the order of about 100 ms, 200 ms, or the like. Although only three instances of the vehicle pose 122 are illustrated in the example 120, it will be appreciated that the pose determination component 108 will determine poses at the frequency during operation vehicle 102. Thus, the three vehicle poses 122a, 122b, 122c, corresponding to the three pose times $T_{pose1}$, $T_{pose2}$, $T_{pose3}$ are shown for example only, to illustrate aspects of this disclosure. Any number of poses at pose times up to and including $T_{poseN}$ may be generated at the operation 118.

At an operation 124, the process 116 includes determining a measurement time associated with a measured value. For example, some aspects of this disclosure, may be directed to estimating a pose of the vehicle at a time other than the pose times $T_{pose1}$, $T_{pose2}$, $T_{pose3}$, . . . . $T_{poseN}$. For instance, it may be beneficial for vehicle localization purposes to determine a pose of the vehicle at a time corresponding to generation of sensor data, such as a LiDAR point cloud, radar returns, image capture, or the like. As generally noted above, the times at which such sensor data is generated may not correspond exactly to one of the pose times.

An example 126 accompanying the operation 124 Illustrates a plurality of measurement times on the timeline 121. Specifically, the example measurement times are illustrated as $T_{Meas1}$, $T_{Meas2}$, $T_{Meas3}$, and $T_{Meas4}$. For example, the measurement times may correspond to instances in time that a single type of measurement, data, or output is generated by a component, system, or subsystem of the vehicle 102. For example, the measurement times may correspond to instances in time in which a camera generates an image, a lidar sensor generates a lidar point cloud, a radar sensor generates radar returns, or the like. In this example, each of the measurement times $T_{Meas}$ is associated with generation of the same sensor data, e.g. from the same sensor. In other examples, each of the measurement times may be associated with a time at which other data is generated. Without limitation, each of the measurement times may be associated with a time at which a computing system generates an output, which output may be based at least in part on sensor data from the sensor(s) 106. The measurement times $T_{Meas}$ are for example only. As will be appreciated, although only four instances of the measurement times are shown in the example 126, an extension of the timeline 121 would show more instances of the $T_{Meas}$, up to and including at a time $T_{MeasN}$.

In the example 126, reference numeral 128 denotes a selected measurement time—$T_{Meas3}$ in the example. For instance, the selected measurement time 128 may be selected, because the data generated at $T_{Meas3}$ may be of particular interest. In one non-limiting example, an image captured at the selected measurement time 128, e.g., at $T_{Meas3}$, may include a feature that may be useful to localize the vehicle 102. The feature in the image captured at the selected measurement time 128 may include a localization feature to be compared to a known position or feature in the environment, e.g., in a localization map, for example.

At an operation 130, the process 116 includes estimating a vehicle pose at the measurement time. The example 132 accompanying the operation 130 schematically illustrates an estimated vehicle pose 134 at the selected measurement time 128. For example, in continuing the example above in which the measured value at the selected measurement time 128 is an image including a localization feature, the operation 130 may be used to estimate a pose of the vehicle 102 at the time that the image feature was captured. This may be unlike other systems that use a "closest-in-time" pose estimation, previous pose estimation, or the like. Specifically, in some high-frequency systems, the variation in poses between the vehicle poses 122 and/or error associated with the pose determinations may be such that the pose can vary greatly between the vehicle poses 122.

In examples of this disclosure, the operation 132 includes determining the estimated pose 134 in a number of different ways. In one example, the estimated pose 134 may be extrapolated from one of the vehicle poses 122. For example this extrapolation is described below in more detail with reference to FIG. 3. In another example, the estimated pose 134 may be determined based on an interpolation of two or more of the vehicle poses 122. Examples of such an interpolation are described below in more detail with reference to FIG. 4. In yet another example, the estimated pose 134 may be determined based at least in part on an interpolation of errors associated with two or more of the vehicle poses 122. Examples of this type of error interpolation are described below in more detail with reference to FIG. 5.

The estimated pose 134 of the vehicle 102 may be used in any number of ways. For example, and as noted above, the pose determination component 108 can incorporate a windowed solver, e.g., that solves for all of the poses 122 within a predetermined window of time. The estimated pose 134 determined according to aspects of this disclosure may be used to attach a factor in the graph used by the global solver, e.g., by associating measurement data with some estimated state, to fully solve for poses again. In the example of FIG. 1, the measured data received at the measurement time 128 is generated (i.e., sensed) before the time associated with the third pose 122c. However, because of system latency, processing times, e.g., at the sensor, or the like, the measured data associated with the measurement time 128 may not be available to the pose determination component 108 when the third pose 122c is first generated. The measured data associated with the measurement time 128 may be available to the pose determination component 108 only after the third pose 122c and, potentially, additional poses, are generated. However, the pose determination system 108 can use the measurement data, once received, by associating the measurement data with the estimated pose 134. Specifically, the estimated pose can act as an anchor for the measurement data. In this example, although the third pose 122c, upon initial determination, may not include the measured data from the measurement time 128, as the solver of the pose determination component 108 re-solves the third pose 122c, later solutions of the third pose 122c will include the measured data from the measurement time. In addition, later poses that are solved (and/or re-solved) will also be based on the updated third pose 122c.

In other examples, the trajectory generation component 112 can include one or more filters, e.g., Kalman filters, that determine a global position of the vehicle 102 using pose data and other information. The trajectory generation component 112 may then use the global position to determine a trajectory along which the vehicle 102 is to travel.

In other examples, the estimated pose 134 of the vehicle 102 may be used by the localization component 114. For example, the localization component 114 can include functionality to compare sensor data, e.g., LiDAR data, radar data, image data, and/or the like, to localization templates to determine a position of the vehicle 102 in the environment. In examples, the localization component 114 can use the techniques detailed herein to estimate a pose, e.g., the estimated pose 134, at the time of generation of the sensor data used to localize the vehicle 102 relative to the localization templates. Functioning of the localization component 114 may be improved using the estimated pose 134 at a time corresponding to the sensor data used for localization, e.g., the measurement time $T_{Meas3}$. As noted above, because of system latency and/or the like, the sensor data associated with the measurement time 128 may be received after some delay. Like the pose determination component system described above, the localization component 114 can perform localization at a predetermined frequency, such that localization can be performed one or more times before the measured data is even received. The techniques described herein can allow the localization component 114 to associate the measured data with the estimate pose 134 corresponding to the measurement time 128, e.g., regardless of when the localization component 114 receives the measured data.

Moreover, although the examples discussed above generally relate to estimating a pose of the vehicle 102, in other examples the techniques detailed herein may be used to estimate poses of objects in an environment, e.g., relative to which a vehicle may travel. In such examples, the poses may correspond to states of an object, such as another vehicle, a pedestrian, a bicyclist, or other object to be tracked. In one non-limiting example, the measured data can include sensor data, e.g., image data, of the object to be tracked. Like in the examples described above, although an instance of the sensor data is generated at the selected measurement time 128, which is before the time associated with generating the third pose 122c, due to latency, processing times, and/or the like, the third pose 122c may be generated without the instance of the sensor data generated at the selected measurement time 128. However, the techniques described herein can be used to determine an estimated pose of the object at the measurement time 128, e.g., regardless of the when the sensor data is actually received.

Although the process 116 has been described in connection with estimating poses at measurement times occurring between pose times, the techniques described herein may be useful to estimate poses at any desired time. Moreover, the techniques described herein are not limited to being used to estimate poses. Without limitation, although vehicle poses are shown, any data that can be extrapolated and/or interpolated may be estimated using techniques described herein.

In some examples, the techniques described herein can be used to reduce an amount of data generated at the vehicle. For example, because the processes performed by the asynchronous data processing system 110 can facilitate robust estimation of poses, the pose determination component 108 may be able to reduce a frequency at which it determines poses. As will be appreciated, by operating at a lower frequency, fewer poses will be re-solved for a windowed estimation. Stated differently, the techniques described herein can allow for generating less sparse data, with the asynchronous data processing system 110 allowing for estimations between times associated with that sparse data.

The techniques described herein also may be used for other purposes. For instance, each of the poses 122 can include a number of different state data values, e.g., tens of dimensions. For instance, each of the poses 122 can include a position, a velocity, IMU biases, wheel scale factors and/or other latent variables. In examples, because some of these variables do not change greatly over time, the poses 122 can include less than all of the state variables, and the techniques described herein can be used to estimate these variable as needed. A pose of the vehicle may include some set of variables, however, the first pose 122a may have a first subset of those variables, the second pose 122b may have a second subset of those variables, and so on. In one example, the first pose 122a may include a first position, a first velocity, and first IMU biases, the second pose 122b may include a second position and a second velocity, but not the IMU biases, and the third pose 122c may include a third position, a third velocity, and second IMU biases. Should the IMU biases be required at the second pose time, $T_{pose2}$, the techniques detailed herein can be used to estimate the IMU biases, e.g., from first IMU biases and the third IMU biases. Thus, in this example, the "estimated pose" may be the complete second pose 122b, parts of which are interpolated from the first pose 122a and the third pose 122c. According to this example, processing can be reduced, because certain state variables may be determined less frequently.

Aspects of this disclosure are useful in complex systems, like autonomous vehicle systems, that receive and/or generate data at various frequencies, using various modalities and computing systems. While some more simple systems may be easy to synchronize, e.g., by coordinating data generation/acquisition times and/or the like, it may be impractical (or impossible) to coordinate data generation in autonomous vehicles and other more complex systems.

Figure 2:
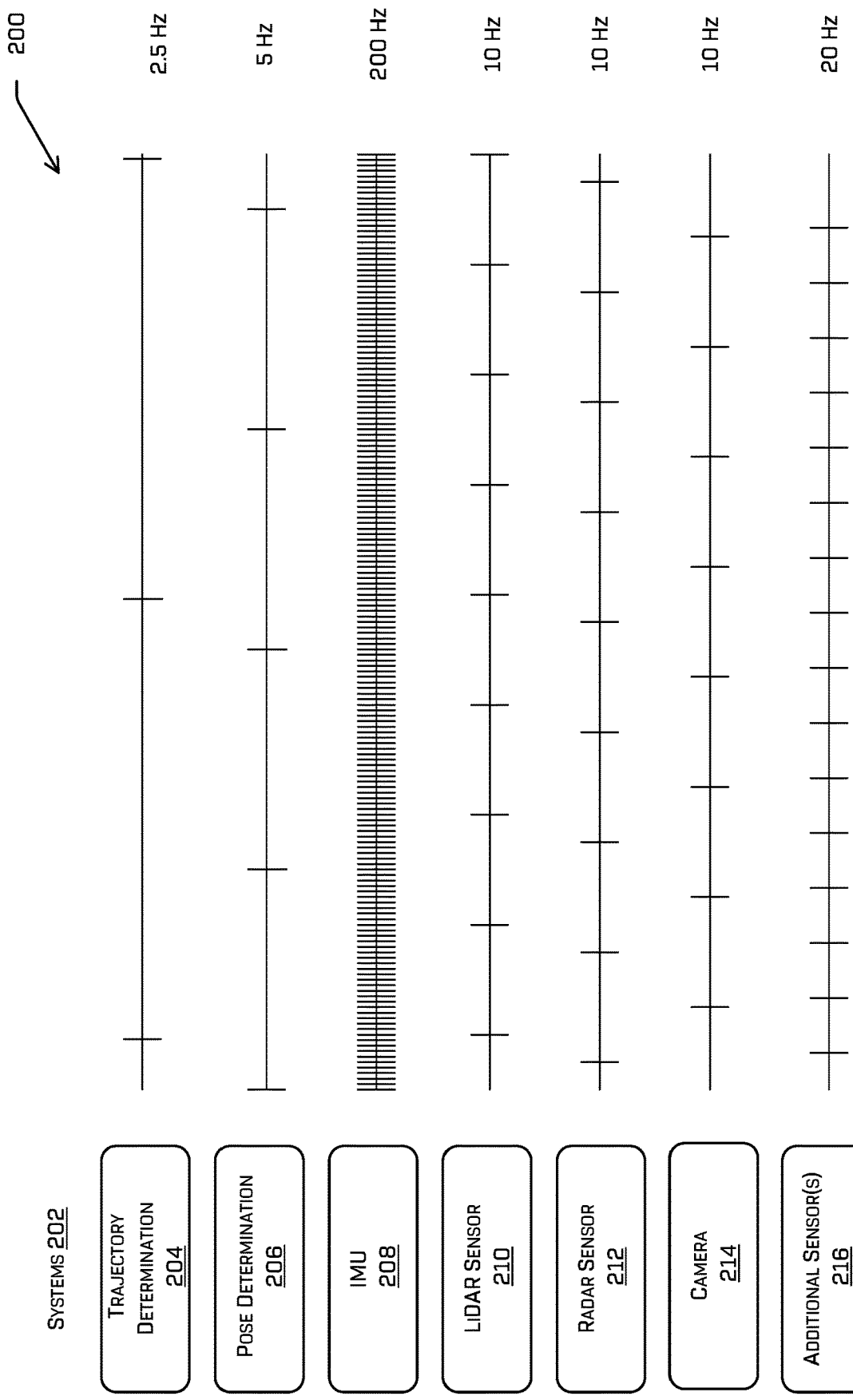
FIG. 2 is a graphical representation of data generation at a plurality of systems of an autonomous vehicle, as described herein.

FIG. 2 is an example of frequency graphs showing data acquisition/generation for a number of systems/subsystems in an autonomous vehicle, which may benefit from the techniques detailed herein. Specifically, FIG. 2 shows a plurality of systems 202, including a trajectory determination system 204, a pose determination system 206, an inertial measurement unit (IMU) 208, a LiDAR sensor 210, a radar sensor 212, a camera 214, and one or more additional sensor(s) 216. As noted, the systems 202 may be systems of an autonomous vehicle, like the vehicle 102 discussed above, and the systems 202 are for example only. In some examples, there may be multiple instances of one or more of the systems 202, some of the systems 202 may not be included, and/or the like.

The trajectory determination system 204 may be the trajectory generation component 120 discussed above. In examples, the trajectory generation component 120 can include a global solver that uses data from a number of other sources, e.g., from other of the systems 202, from other data generation components, and/or the like, to determine a position of the vehicle in the environment, e.g., a global position. The trajectory determination system 204 can also include functionality to estimate one or more future positions of the vehicle, to re-determine previous positions. In still further examples, the trajectory determination system 204 can generate a trajectory as a collection of a number of global positions, e.g., over a time period, and generate future trajectories for the vehicle through the environment. As illustrated, the trajectory determination system 204 may be one of the slower systems 202. As shown, in one example the trajectory determination system 204 may generate data, e.g., a global position of the vehicle and/or a trajectory of the vehicle, at a frequency of 2.5 Hz. Of course, this is for example only.

The pose determination system 206 may be the pose determination component 108 discussed above. For instance, the pose determination system 206 can generate the vehicle poses 122 at a predetermined frequency, e.g., at a frequency of 5 Hz. As will be appreciated, the example frequency is for example only. However, the frequency at which the pose determination system 206 generates the vehicle poses 122 may be higher than the frequency at which the trajectory determination system 204 generates data. As also illustrated, although in the example of FIG. 2, the frequency associated with the pose determination system 206 is twice that associated with the trajectory determination system 204, the generation of data is not synchronized. For example, every other instance at which the pose determination system 206 generates a pose does not correspond in time with each instance at which the trajectory determination system 204 generates data. In examples, syncing the outputs of the two systems 204, 206 may be impractical.

The IMU 208 is illustrated as generating IMU data, e.g., accelerometer and/or gyroscope outputs, at a much higher rate than both the trajectory determination system 204 and the pose determination system 206. In the example, the IMU 208 generates IMU data at 200 Hz. In examples, the IMU 208 may be one of the higher-frequency systems on the autonomous vehicle. In some examples, the high frequency output of the IMU 208 may assist in determining the estimated vehicle poses and/or other data estimates, as detailed further herein.

The LiDAR sensor 210, the radar sensor 212, and the camera 214 are all sensing systems that generate different types of sensor data. For instance, the LiDAR sensor 210 can generate a 3D LiDAR point cloud, the radar sensor 212 can generate radar returns in either two- or three-dimensional space, and the camera 214 can generate image data. In the examples, each of the sensor systems generates data at the same rate, e.g., at a frequency of 10 Hz, but as illustrated, the instances of data generated by the LiDAR sensor 210, the radar sensor 212, and the camera 214 are not synchronized. That is, the sensors 210, 212, 214 generate data at the same frequency, but at asynchronous times.

The additional sensor(s) 216 may be any types of sensors or other systems that generate data. Although the other sensor(s) 216 are illustrated as generating data at 20 Hz, that frequency is for example only. As will be appreciated from this disclosure, any data, collected or generated at any frequency may be useful for aspects of this disclosure.

Figure 3:
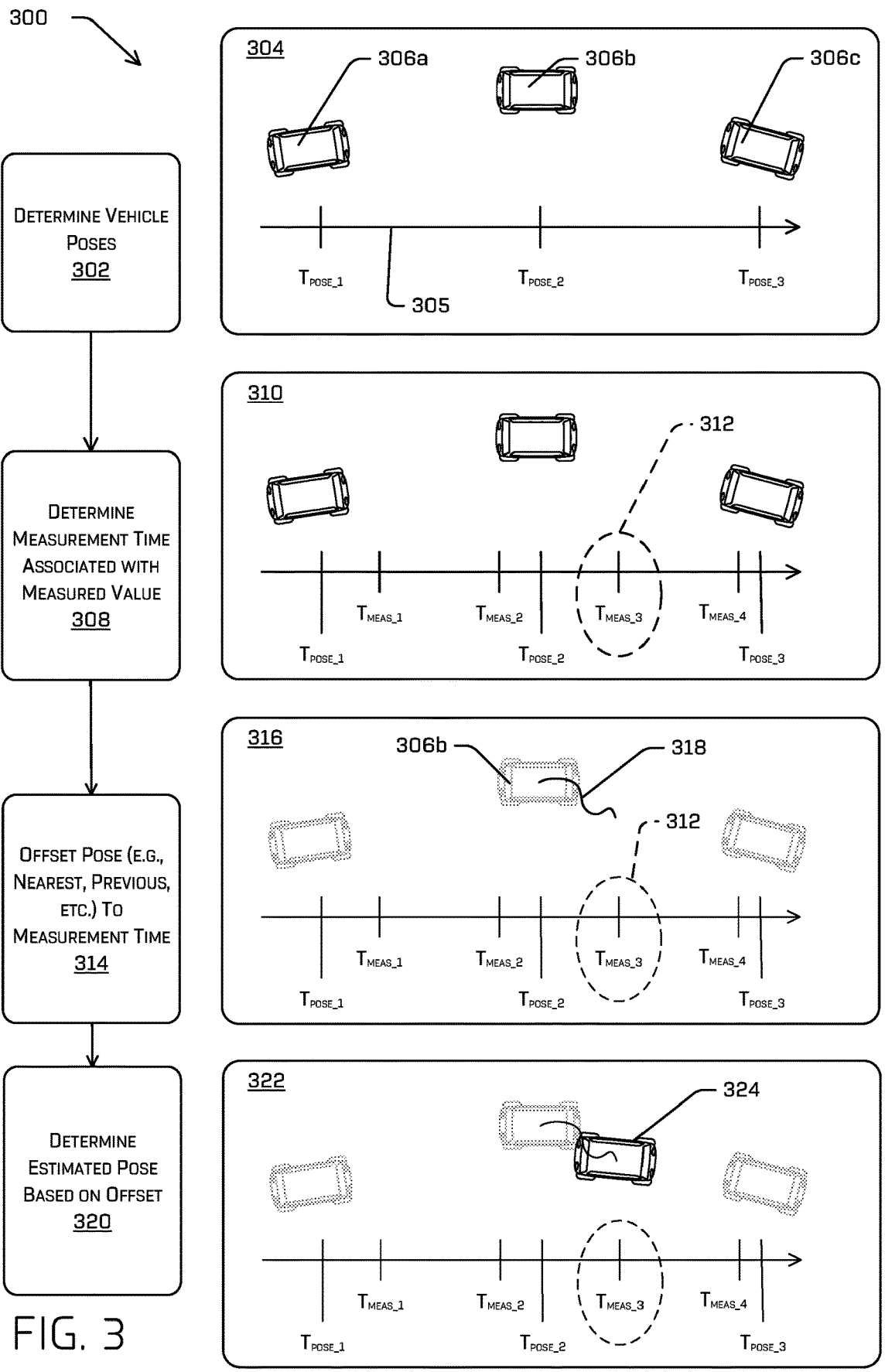
FIG. 3 includes textual and visual flowcharts to illustrate an example method for estimating a vehicle pose from known pose data, as described herein.

FIG. 3 includes textual and visual flowcharts to illustrate an example process 300 for determining estimated data, e.g., at a target measurement time. In examples described herein, the estimated data may be an estimated pose of an autonomous vehicle at a target time corresponding to a time at which a measurement is taken.

At an operation 302, the process 300 includes determining vehicle poses. The operation 302 may generally correspond to the operation 118 discussed above and/or may be performed by the pose determination component 108 or the pose determination system 206, generally as described above. An example 304 accompanying the operation 302 includes a timeline 305 on which are schematically illustrated a first vehicle pose 306a at a first pose time $T_{pose1}$, a second vehicle pose 306b at a second pose time, $T_{pose2}$, and a third vehicle pose 306c at a third pose time, $T_{pose3}$. (Collectively, the first vehicle pose 306a, the second vehicle pose 306b, and the third vehicle pose 306c, as well as additional and/or other vehicle poses not represented in the example 304, may be referred to as "the vehicle poses 306.")

In examples, the pose determination component 108 or the pose determination system 206 generates the vehicle poses 306 at a predetermined frequency, e.g. at a time interval $\Delta T$, corresponding to the time between $T_{pose1}$ and $T_{pose2}$, $T_{pose2}$ and $T_{pose3}$, or the like. Although only three instances of the vehicle pose 306 are illustrated in the example 304, it will be appreciated that the pose determination component 108 will determine poses at the frequency during vehicle operation. Thus, the three vehicle poses 306a, 306b, 306c, corresponding to the three pose times $T_{pose1}$, $T_{pose2}$, $T_{pose3}$ are shown for example only, to illustrate aspects of this disclosure. Any number of poses at pose times up to and including $T_{poseN}$ may be generated at the operation 302.

At an operation 308, the process 300 includes determining a measurement time associated with a measured value. The operation 308 may correspond to the operation 124 discussed above. For example, some aspects of this disclosure, may be directed to estimating a pose of the vehicle at a time other than the pose times $T_{pose1}$, $T_{pose2}$, $T_{pose3}$, . . . . $T_{poseN}$. As discussed above, it may be beneficial to determine a pose of a vehicle at a time corresponding to generation of sensor data, such as a LiDAR point cloud, radar returns, image capture, or the like. As generally noted above, the times at which on-vehicle systems, including but not limited to the systems 202 discussed above, generate sensor data may not correspond exactly to one of the pose times.

An example 310 accompanying the operation 308 illustrates a plurality of measurement times on the timeline 305. Specifically, the example measurement times are illustrated as $T_{Meas1}$, $T_{Meas2}$, $T_{Meas3}$, and $T_{Meas4}$. For example, the measurement times may correspond to instances in time at which a single type of measurement, data, or output is generated by a component, system, or subsystem of a vehicle, e.g., by one of the systems 202 discussed above. In the example 310 each of the measurement times $T_{Meas}$ is associated with generation of the same sensor data, e.g. from the same sensor. In other examples, each of the measurement times may be associated with a time at which other data is generated. Without limitation, each of the measurement times may be associated with a time at which a computing system generates an output. The measurement times $T_{Meas}$ are for example only. As will be appreciated, although only four instances of the measurement times are shown in the example 310, an extension of the timeline 305 would show more instances of $T_{Meas}$, up to and including a time $T_{MeasN}$.

In the example 310, reference numeral 312 denotes a selected measurement time $T_{Meas3}$ in the example. For instance, the selected measurement time 312 may be selected because the data generated at $T_{Meas3}$ may be of particular interest. In one non-limiting example, an image captured at the selected measurement time 312, e.g., at $T_{Meas3}$, may include a feature that may be useful to localize a vehicle. The feature in the image captured at the selected measurement time 312 may include a localization feature to be compared to a known position or feature in the environment, e.g., in a localization map or localization template, for example.

At an operation 314, the process 300 includes offsetting a vehicle pose to the measurement time. For example, the operation 314 can include offsetting one of the vehicle poses 306 determined at the operation 302 to the measurement time 312 determined at the operation 308. An example 316 accompanying the operation 314 in FIG. 3 includes a schematic representation of an offset 318. More specifically, the offset 318 is illustrated as an offset of the second vehicle pose 306b to the measurement time 312. In this example, the offset is an extrapolation of the second vehicle pose 306b. The second vehicle pose 306b may be selected as the basis for the offset 318 because the second vehicle pose 306b is the most recently determined one of the vehicle poses 306, e.g., prior to the measurement time 312. In other examples, the basis for the offset may be the one of the vehicle poses 306 that is the closest in time to the measurement time 312. In the example 316, the second vehicle pose 306b is also the closest of the vehicle poses to the measured time 312.

The vehicle pose used for the offset may be otherwise determined. For example, the vehicle pose used for the basis of the offset may be the next-determined, e.g., after the measurement time 312. In still further examples, a vehicle pose that has a highest associated confidence value (e.g., as determined by the pose determination system 108) and is within a threshold time of the measurement time 312 may be used. Other criteria may also be used to determine the one of the vehicle poses from which the offset should be determined.

The offset may be an extrapolation of the vehicle pose 306b. In at least one example, the offset can be an integration of the vehicle pose 306b. For instance, the integration can be based at least in part on IMU data, e.g., received from the IMU 208. As detailed above, the IMU 208 generates data at a relatively high rate. The operation 314 can include identifying IMU data at the measurement time 312 (or IMU data very close in time to the IMU data), and the offset 318 may be representative of a function of the IMU data and the vehicle pose 306b, e.g., an integration based on the IMU data. In still further examples, the offset 318 can represent one or more smooth poses, generated according to the teachings of U.S. patent application Ser. No. 17/491,091, filed on Sep. 30, 2021, which is incorporated hereby by reference in its entirety for all purposes.

At an operation 320, the process 300 includes determining an estimated pose based on the offset. An example 322 accompanying the operation 320 shows the estimated pose 324 at the measurement time 312.

Figure 4:
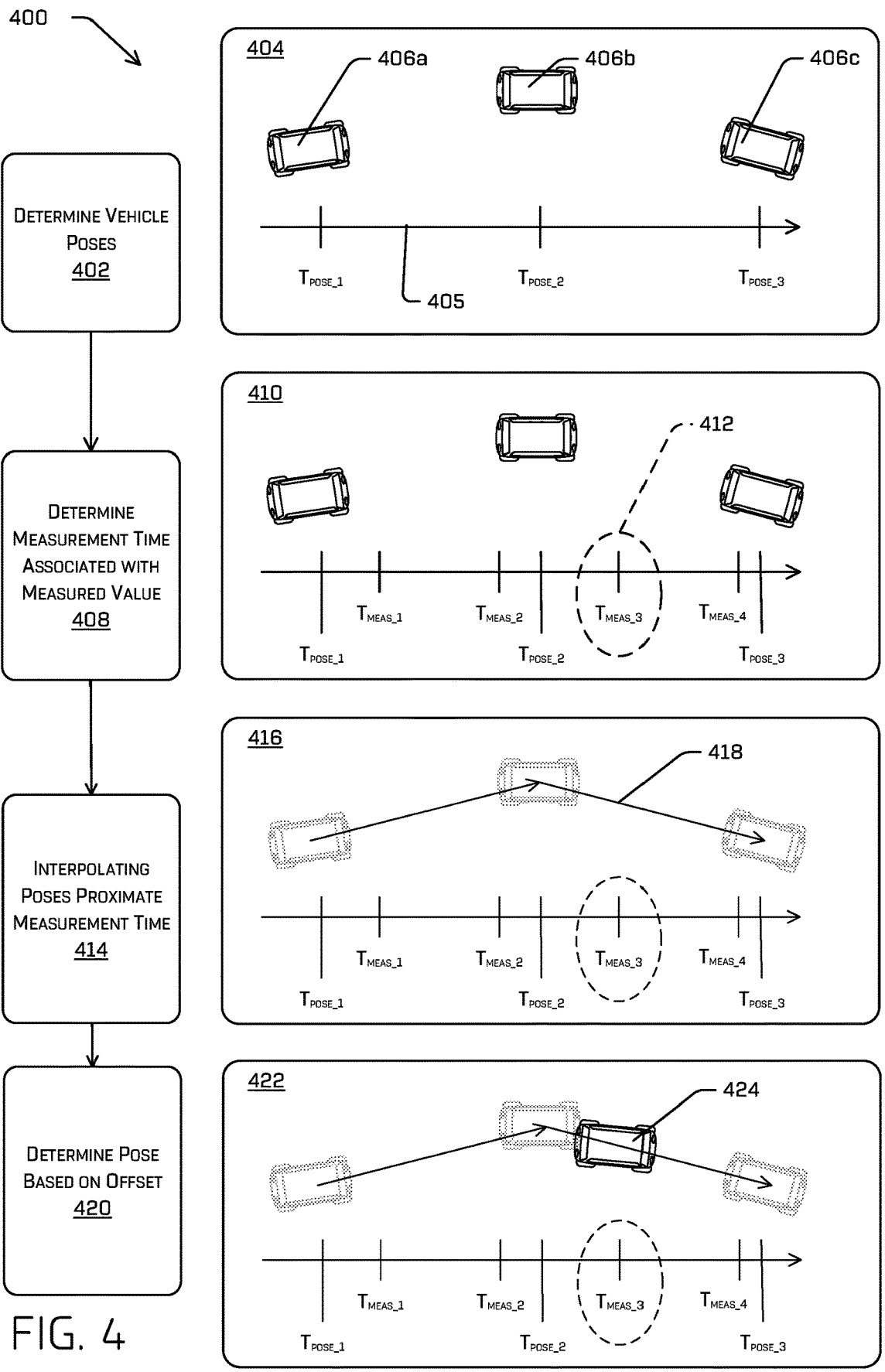
FIG. 4 includes textual and visual flowcharts to illustrate another example method for estimating a vehicle pose from known pose data, as described herein.

FIG. 4 includes textual and visual flowcharts to illustrate an example process 400 for determining estimated data, e.g., at a target measurement time. In examples described herein, the estimated data may be an estimated pose of an autonomous vehicle at a target time corresponding to a time at which a measurement is taken. The process 400 may be an alternative to the process 300.

At an operation 402, the process 400 includes determining vehicle poses. The operation 402 may generally correspond to the operation 118 and/or the operation 302 discussed above and/or may be performed by the pose determination component 108 or the pose determination system 206, generally as described above. An example 304 accompanying the operation 402 includes a timeline 405 on which are schematically illustrated a first vehicle pose 406a at a first pose time $T_{pose1}$, a second vehicle pose 406b at a second pose time, $T_{pose2}$, and a third vehicle pose 406c at a third pose time, $T_{pose4}$. (Collectively, the first vehicle pose 406a, the second vehicle pose 406b, and the third vehicle pose 406c, as well as additional and/or other vehicle poses not represented in the example 404, may be referred to as "the vehicle poses 406.") In examples, the pose determination component 108 or the pose determination system 206 generates the vehicle poses 406 at a predetermined frequency, e.g. at a time interval $\Delta T$, corresponding to the time between $T_{pose1}$ and $T_{pose2}$, $T_{pose2}$ and $T_{pose3}$, or the like. Although only three instances of the vehicle pose 406 are illustrated in the example 404, it will be appreciated that the pose determination component 108 will determine poses at the frequency during vehicle operation. Thus, the three vehicle poses 406a, 406b, 406c, corresponding to the three pose times $T_{pose1}$, $T_{pose2}$, $T_{pose3}$ are shown for example only, to illustrate aspects of this disclosure. Any number of poses at pose times up to and including $T_{poseN}$ may be generated at the operation 402.

At an operation 408, the process 400 includes determining a measurement time associated with a measured value. The operation 408 may correspond to the operation 124 and/or the operation 308 discussed above. For example, some aspects of this disclosure, may be directed to estimating a pose of the vehicle at a time other than the pose times $T_{pose1}$, $T_{pose2}$, $T_{pose3}$, . . . . $T_{poseN}$. As discussed above, it may be beneficial to determine a pose of a vehicle at a time corresponding to generation of sensor data, such as a LiDAR point cloud, radar returns, image capture, or the like. As generally noted above, the times at which on-vehicle systems, including but not limited to the systems 202 discussed above, generate sensor data may not correspond exactly to one of the pose times.

An example 410 accompanying the operation 408 illustrates a plurality of measurement times on the timeline 405. Specifically, the example measurement times are illustrated as $T_{Meas1}$, $T_{Meas2}$, $T_{Meas3}$, and $T_{Meas4}$. For example, the measurement times may correspond to instances in time at which a single type of measurement, data, or output is generated by a component, system, or subsystem of a vehicle, e.g., by one of the systems 202 discussed above. In the example 410 each of the measurement times $T_{Meas}$ is associated with generation of the same sensor data, e.g. from the same sensor. In other examples, each of the measurement times may be associated with a time at which other data is generated. Without limitation, each of the measurement times may be associated with a time at which a computing system generates an output. The measurement times $T_{Meas}$ are for example only. As will be appreciated, although only four instances of the measurement times are shown in the example 410, an extension of the timeline 405 would show more instances of $T_{Meas}$, up to and including a time $T_{MeasN}$.

In the example 410, reference numeral 412 denotes a selected measurement time—$T_{Meas3}$ in the example. For instance, the selected measurement time 412 may be selected because the data generated at $T_{Meas4}$ may be of particular interest. In one non-limiting example, an image captured at the selected measurement time 412, e.g., at $T_{Meas3}$, may include a feature that may be useful to localize a vehicle. The feature in the image captured at the selected measurement time 412 may include a localization feature to be compared to a known position or feature in the environment, e.g., in a localization map or localization template, for example.

At an operation 414, the process 400 includes interpolating poses proximate the measurement time. For example, the operation 414 can include determining an interpolation of two or more of the vehicle poses 406 determined at the operation 402 proximate the measurement time 412 determined at the operation 408. An example 416 accompanying the operation 414 in FIG. 4 includes a schematic representation of an interpolation 418. More specifically, the interpolation 418 is illustrated as a linear interpolation of the second vehicle pose 406b and the third vehicle pose 406c. The second vehicle pose 406b is the one of the vehicle poses 406 that immediately precedes the measurement time 412, and the third vehicle pose 406c is the one of the vehicle poses 406 that immediately follows the measurement time 412.

The interpolation 418 in the example 416 is a linear interpolation of the second vehicle pose 406b and the third vehicle pose 406c. However, this disclosure is not limited to a linear interpolation between two poses. In examples, the interpolation 418 may be a higher-order interpolation, may be a spline, and/or may be other types of interpolations. Moreover, because several vehicle poses are known, the interpolation 418 may be based on more than two of the vehicle poses 406. Interpolating the vehicle poses 406 to the measurement time may be preferable to interpolating measurements to the pose time. That is, some systems could use two raw measurements, e.g., at two consecutive measurement times, and determine an interpolated measurement at the pose time. However, such an approach may correlate the noise for the interpolated measurements, for instance, if the same raw measurement is used in multiple different interpolations. Instead, interpolating the vehicle poses to the measurement time, as in the process 400, may account for the interpolation in the measurement function.

At an operation 420, the process 400 includes determining an estimated pose based on the offset. An example 422 accompanying the operation 420 shows the estimated pose 424 at the measurement time 412.

Figure 5:
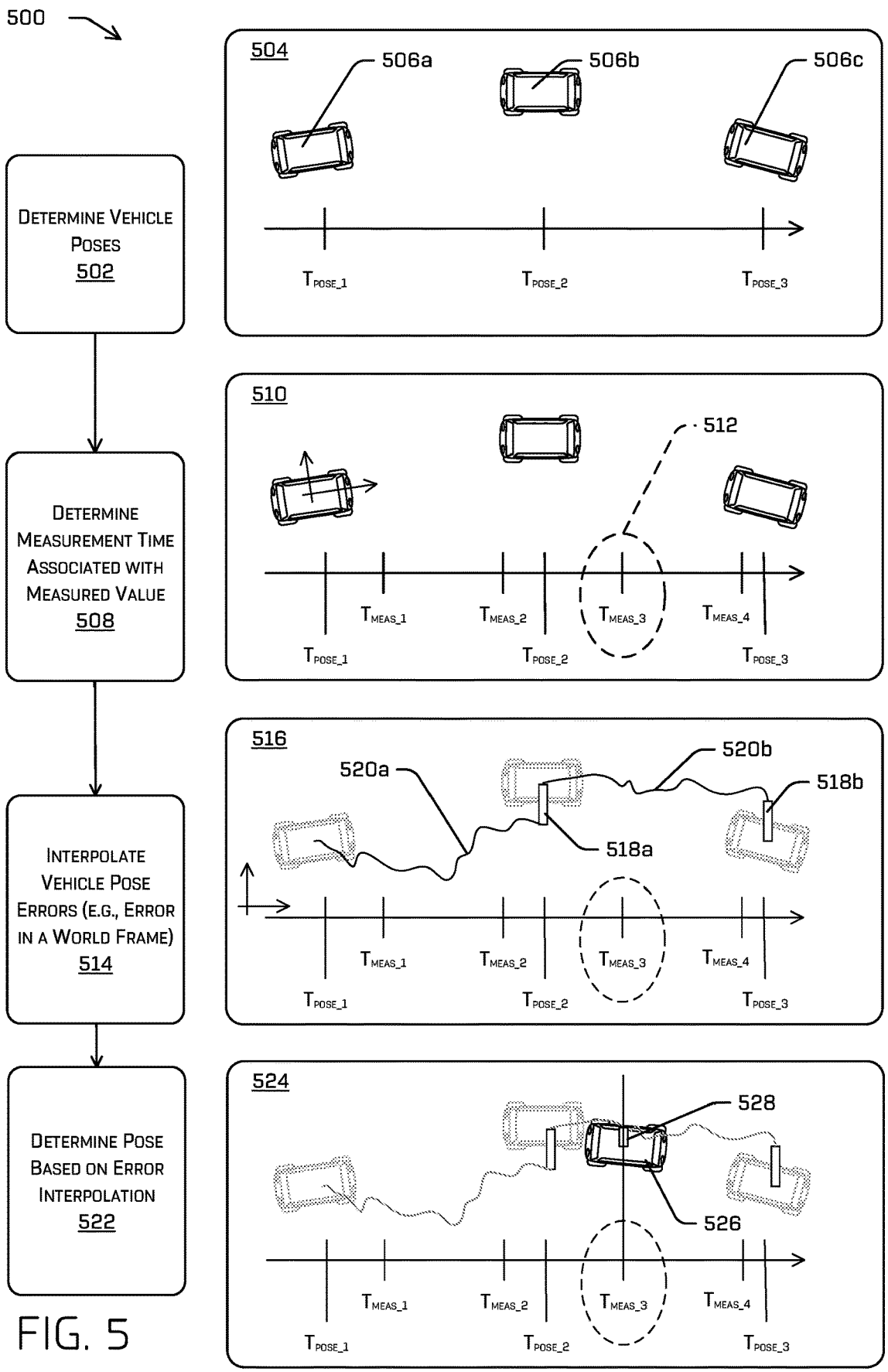
FIG. 5 includes textual and visual flowcharts to illustrate another example method for estimating a vehicle pose from known pose data, as described herein.

FIG. 5 includes textual and visual flowcharts to illustrate an example process 500 for determining estimated data, e.g., at a target measurement time. In examples described herein, the estimated data may be an estimated pose of an autonomous vehicle at a target time corresponding to a time at which a measurement is taken. The process 500 may be an alternative to the process 300 and/or to the process 400. For example, the process 500 may be useful when trajectory dynamics are high between pose samples, as a straight interpolation of poses, as in the process 400 may introduce extra error.

At an operation 502, the process 500 includes determining vehicle poses. The operation 502 may generally correspond to any of the operations 118, 302, and/or 402 discussed above and/or may be performed by the pose determination component 108 or the pose determination system 206, generally as described above. An example 504 accompanying the operation 502 includes a timeline 505 on which are schematically illustrated a first vehicle pose 506a at a first pose time $T_{pose1}$, a second vehicle pose 506b at a second pose time, $T_{pose2}$, and a third vehicle pose 506c at a third pose time, $T_{pose5}$. (Collectively, the first vehicle pose 506a, the second vehicle pose 506b, and the third vehicle pose 506c, as well as additional and/or other vehicle poses not represented in the example 504, may be referred to as "the vehicle poses 506.") In examples, the pose determination component 108 and/or the pose determination system 206 generates the vehicle poses 506 at a predetermined frequency, e.g. at a time interval ΔT, corresponding to the time between $T_{pose1}$ and $T_{pose2}$, $T_{pose2}$ and $T_{pose3}$, or the like. Although only three instances of the vehicle pose 506 are illustrated in the example 504, it will be appreciated that the pose determination component 108 will determine poses at the frequency during vehicle operation. Thus, the three vehicle poses 506a, 506b, 506c, corresponding to the three pose times $T_{pose1}$, $T_{pose2}$, $T_{pose5}$ are shown for example only, to illustrate aspects of this disclosure. Any number of poses at pose times up to and including $T_{poseN}$ may be generated at the operation 502.

At an operation 508, the process 500 includes determining a measurement time associated with a measured value. The operation 508 may correspond to the operation 124 discussed above. For example, some aspects of this disclosure may be directed to estimating a pose of the vehicle at a time other than the pose times $T_{pose1}$, $T_{pose2}$, $T_{pose3}$, . . . . $T_{poseN}$. As discussed above, it may be beneficial to determine a pose of a vehicle at a time corresponding to generation of sensor data, such as a LiDAR point cloud, radar returns, image capture, or the like. As generally noted above, the times at which on-vehicle systems, including but not limited to the systems 202 discussed above, generate sensor data may not correspond exactly to one of the pose times.

An example 510 accompanying the operation 508 illustrates a plurality of measurement times on the timeline 505. Specifically, the example measurement times are illustrated as $T_{Meas1}$, $T_{Meas2}$, $T_{Meas3}$, and $T_{Meas4}$. For example, the measurement times may correspond to instances in time that a single type of measurement, data, or output is generated by a component, system, or subsystem of a vehicle, e.g., by one of the systems 202 discussed above. In the example 510 each of the measurement times $T_{Meas}$ is associated with generation of the same sensor data, e.g. from the same sensor. In other examples, each of the measurement times may be associated with a time at which other data is generated. Without limitation, each of the measurement times may be associated with a time at which a computing system generates an output. The measurement times $T_{Meas}$ are for example only. As will be appreciated, although only four instances of the measurement times are shown in the example 510, an extension of the timeline 505 would show more instances of $T_{Meas}$, up to and including a time $T_{MeasN}$.

In the example 510, reference numeral 512 denotes a selected measurement time-$T_{Meas3}$ in the example. For instance, the selected measurement time 512 may be selected because the data generated at $T_{Meas3}$ may be of particular interest. In one non-limiting example, an image captured at the selected measurement time 512, e.g., at $T_{Meas3}$, may include a feature that may be useful to localize a vehicle. The feature in the image captured at the selected measurement time 512 may include a localization feature to be compared to a known position or feature in the environment, e.g., in a localization map or localization template, for example.

At an operation 514, the process 500 includes interpolating vehicle pose errors. For example, the operation 514 can include interpolating errors associated with the vehicle poses 506 determined at the operation 502. An example 516 accompanying the operation 514 in FIG. 5 includes a schematic representation of a first error 518a associated with the second vehicle pose 506b and of a second error 518b associated with the third vehicle pose 506c. For example, the errors 518 may be errors determined during or otherwise in association with the operation 502.

The example 516 also schematically shows a first pose interpolation 520a between the first vehicle pose 508a and the second vehicle pose 508b, and a second pose interpolation 520b between the second vehicle pose 508b and the third vehicle pose 508c. As will be appreciated, the second vehicle pose 506b includes the first error 518a, and the third vehicle pose includes the second error 518b. However, the pose interpolations 520 are determined without the errors. The pose interpolations 520 may be representative of poses determined according to the offsets 318 and/or the interpolations 418 discussed above. For example, and without limitation, the pose interpolations may be representative of integrations of the vehicle poses 506. For instance, the integration can be based at least in part on IMU data, e.g., received from the IMU 208. As detailed above, the IMU 208 generates data at a relatively high rate. The operation 514 can include identifying IMU data at times between the pose times, $T_{pose}$, and the pose interpolations 520 may be representative of a function of the IMU data and the vehicle poses 506. In still further examples, the interpolations 520 may correspond to smooth poses, e.g., generated according to the teachings of U.S. patent application Ser. No. 17/491,091, filed on Sep. 30, 2021, which is incorporated hereby by reference in its entirety for all purposes.

In the process 400, the pose errors 518 may be errors in the world frame, e.g., instead of in a local or vehicle frame. In examples, pose errors represented in the world frame are smoother than when represented in the vehicle frame.

At an operation 522, the process 500 includes determining an estimated pose based on the error interpolation. An example 524 accompanying the operation 522 shows an estimated pose 524 at the measurement time 512. The estimated pose 526 is offset from the pose interpolation 520b by an interpolated error 528. For example, the interpolated error 528 may be a percentage of the second pose error 518b corresponding to a percentage of elapsed time between $T_{pose2}$ and $T_{pose3}$, at the measurement time 312.

In examples, if the trajectory dynamics between the poses 506 is high, the process 500 may interpolate the error, e.g., the smooth pose error, from the whole interval onto the estimated pose at the measurement time. Aspects of this process 500 can also be represented mathematically. For example, given the pose of the body frame (B) with respect to a global or world frame (W), at times $t_{pose1}$ and $t_{pose2}$, which bracket a measurement time $t_{meas1}$:

$$_W T_{B_{Tpose1}} \text{ and } _W T_{B_{Tpose2}} \qquad \text{Eqns. (1) and (2)}$$

and given a high rate dead reckoned or inertial integrated trajectory of the interval such that we can compute the relative poses:

$$B_{Tpose1} T_{B_{Tmeas1}} \text{ and } B_{Tpose2} T_{B_{Tmeas2'}} \qquad \text{Eqns. (3) and (4)}$$

the interpolated pose at the measurement time is:

$$_W T_{B_{Tmeas1'}} \qquad \text{Eqn. (5)}$$

The integrated trajectory will drift and there will be an error at $T_{pose2}$ that can be expressed as a correction in the world frame:

$$_W \Delta(T_{pose2}) = _W T_{B_{Tpose2}} * (_W T_{B_{Tpose1}} * B_{Tpose1} T_{B_{Tpose2}})^{-1} \qquad \text{Eqn. (6)}$$

For example, $_{B_{Tpose1}} T_{B_{Tpose2}}$ may be obtain from odometry, e.g., an IMU integration, whereas $_W T_{B_{Tpose1}}$ and $_W T_{B_{Tpose2}}$ may be obtained by the solver. A linear interpolation of this error using the pose manifold log and exponential functions yields a correction in the world frame that applies for the integrated pose at $t_{meas1}$:

$$_W \Delta T_{meas1} = \exp(\propto \log(_W \text{error}(t_{pose2}))) \qquad \text{Eqn. (7)}$$

where:

$$\propto = \frac{t_{meas1} - t_{pose1}}{t_{pose2} - t_{pose1}} \qquad \text{Eqn. (8)}$$

Applying the correction to get the interpolated pose at $t_{meas1}$:

$$_W T_{B_{Tmeas1}} = _W \Delta(T_{tmeas1}) * _W T_{B_{Tpose1}} * B_{Tpose1} _W T_{B_{Tmeas1}} \qquad \text{Eqn. (9)}$$

From Equation (9), it is evident that when $t_{meas1}$ equals one of the pose times, a will be either 1 or 0 and the interpolation exactly matches the low frequency pose estimate, e.g., the vehicle pose 506 at the corresponding pose time.

Figure 6:
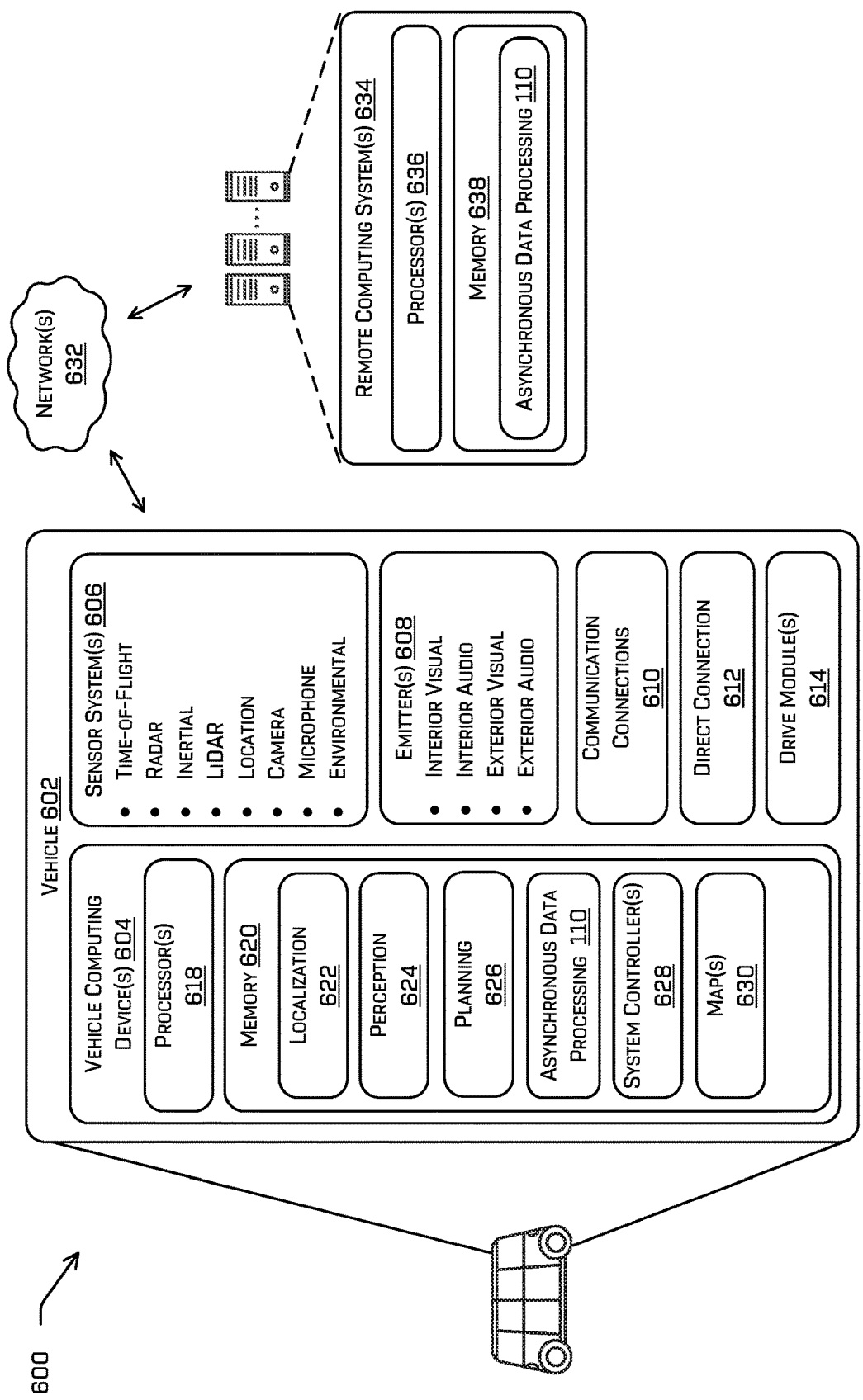
FIG. 6 is a block diagram of an example computing system for implementing the techniques described herein.

FIG. 6 is a block diagram of an example system 600 for implementing the techniques described herein. In at least one example, the system 600 can include a vehicle 602, which can be the same vehicle as the vehicle 102 described above with reference to FIG. 1.

The vehicle 602 can include one or more vehicle computing devices 604, one or more sensor systems 606, one or more emitters 608, one or more communication connections 610, at least one direct connection 612, and one or more drive modules 614.

The vehicle computing device(s) 604 can include one or more processors 618 and memory 620 communicatively coupled with the one or more processors 618. In the illustrated example, the vehicle 602 is an autonomous vehicle; however, the vehicle 602 could be any other type of vehicle. In the illustrated example, the memory 620 of the vehicle computing device 604 stores a localization component 622, a perception component 624, a planning component 626, the asynchronous data processing component 110, one or more system controllers 628, and one or more maps 630. Though depicted in FIG. 6 as residing in the memory 620 for illustrative purposes, it is contemplated that the localization component 622, the perception component 624, the planning component 626, the one or more system controllers 628, the asynchronous data processing component 110, and/or the map(s) 630 can additionally, or alternatively, be accessible to the vehicle 602 (e.g., stored on, or otherwise accessible by, memory remote from the vehicle 602).

In at least one example, the localization component 622 can include functionality to receive data from the sensor system(s) 606 to determine a position and/or orientation of the vehicle 602 (e.g., one or more of an x-, y-, z-position, roll, pitch, or yaw). For example, the localization component 622 can include and/or request/receive a map of an environment and can continuously determine a location and/or orientation of the autonomous vehicle within the map. In some instances, the localization component 622 can utilize SLAM (simultaneous localization and mapping), calibration, localization and mapping, simultaneously techniques, relative SLAM, bundle adjustment, non-linear least squares optimization, or the like to receive image data, LiDAR data, radar data, IMU data, GPS data, wheel encoder data, and the like to accurately determine a location of the autonomous vehicle. In some instances, the localization component 622 can provide data to various components of the vehicle 602 to determine an initial position of an autonomous vehicle for generating a candidate trajectory, as discussed herein.

In some instances, the perception component 624 can include functionality to perform object detection, segmentation, and/or classification. In some examples, the perception component 624 can provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional and/or alternative examples, the perception component 624 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. By way of non-limiting example, the perception component 624 may generate the object representations 136, 218 from radar data, as discussed herein.

The planning component 626 can determine a path for the vehicle 602 to follow to traverse through an environment. The planning component 626 can determine various routes and trajectories and various levels of detail. For example, the planning component 626 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 626 can generate an instruction for guiding the autonomous vehicle along at least a portion of the route from the first location to the second location. In at least one example, the planning component 626 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In at least one example, the vehicle computing device 604 can include one or more system controllers 628, which can be configured to control steering, propulsion, braking, safety, emitters, communication, and other systems of the vehicle 602. These system controller(s) 628 can communicate with and/or control corresponding systems of the drive module(s) 614 and/or other components of the vehicle 602.

Although shown separate from other components for clarity and ease of reference, functionality of the asynchronous data processing component 110 may be performed by other aspects of the vehicle 602. Without limitation, that component may be incorporated into the localization system 622, the planning system 626, and/or other components. Aspects of this disclosure provide improved functionality resulting at least in part from use of a singular representation of a plurality of radar returns, regardless of the module, component, or system using that data according to the techniques detailed herein.

In at least one example, the sensor system(s) 606 can include some of the systems 202 detailed above. Also in examples, the sensor system(s) 606 can include radar sensors, LiDAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, and as discussed herein, implementations of this disclosure may use multiple scans from multiple sensors, e.g., multiple radar sensors, with overlapping fields of view. Thus, for example, the autonomous vehicle 602 may include a number of radar sensors. In additional examples, the LiDAR sensors can include individual LiDAR sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally, or alternatively, the sensor system(s) 606 can send sensor data, via the one or more networks 636, to the one or more computing device(s) at a particular frequency, after a lapse of a predetermined period of time, in near real-time, etc.

The emitter(s) 608 may be configured to emit light and/or sound. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. In some examples, one or more of the interior emitters may be used to signal to the passenger that the vehicle is approaching or has arrived at an unmapped region and that continued movement in the unmapped region will require permission and/or manual control. In addition, or alternatively, the interior emitters may alert the passenger(s) that a teleoperator or other external source (e.g., a passenger-in-waiting) has taken manual control of the vehicle 602. The emitter(s) 608 in this example can also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 610 can enable communication between the vehicle 602 and one or more other local or remote computing device(s). For instance, the communication connection(s) 610 can facilitate communication with other local computing device(s) on the vehicle 602 and/or the drive module(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote controllers.

The communications connection(s) 610 can include physical and/or logical interfaces for connecting the vehicle computing device 604 to another computing device or a network, such as network(s) 636. For example, the communications connection(s) 610 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include the drive module(s) 614. In some examples, the vehicle 602 can have a single drive module 614. In at least one example, if the vehicle 602 has multiple drive modules 614, individual drive modules 614 can be positioned on opposite ends of the vehicle 602 (e.g., the front and the rear, etc.). In at least one example, the drive module(s) 614 can include one or more sensor systems to detect conditions of the drive module(s) 614 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, radar sensors, etc. Some sensors, such as the wheel encoders can be unique to the drive module(s) 614. In some cases, the sensor system(s) 606 on the drive module(s) 614 can overlap or supplement corresponding systems of the vehicle 602 (e.g., the sensor system(s) 606).

The drive module(s) 614 can include many vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 614 can include a drive module controller which can receive and preprocess data from the sensor system(s) 606 and to control operation of the various vehicle systems. In some examples, the drive module controller can include one or more processors and memory communicatively coupled with the one or more processors. The memory can store one or more modules to perform various functionalities of the drive module(s) 614. Furthermore, the drive module(s) 614 also include one or more communication connection(s) that enable communication by the respective drive module with one or more other local or remote computing device(s).

In at least one example, the direct connection 612 can provide a physical interface to couple the one or more drive module(s) 614 with the body of the vehicle 602. For example, the direction connection 612 can allow the transfer of energy, fluids, air, data, etc. between the drive module(s) 614 and the vehicle. In some instances, the direct connection 612 can further releasably secure the drive module(s) 614 to the body of the vehicle 602.

In at least one example, the vehicle 602 may be in communication, via one or more network(s) 632, with one or more remote computing system(s) 634. For example, as described herein, the vehicle 602 can communicate with the one or more remote computing system(s) 634 via the network(s) 632. In some examples, the vehicle 602 can receive control signals from the remote computing system(s) 634. In other examples, the vehicle 602 can transmit information to the remote computing system(s) 634.

The remote computing system(s) 634 may be embodied as a fleet management system. In at least one example, the remote computing system(s) 634 can include processor(s) 636 and memory 638 communicatively coupled with the processor(s) 636. In the illustrated example, the memory 638 of the remote computing system(s) 634 stores an instance of the asynchronous data processing component 110. For instance, and without limitation, the techniques associated with the asynchronous data processing component 110 at the remote computing system(s) 634 may be used to estimate data, including but not limited to pose data, for processing performed at the remote computing system(s) 634.

In some instances, aspects of some or all of the components discussed herein can include any models, algorithms, and/or machine learning algorithms. For example, in some instances, aspects of the components in the memory 620, 638 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 7:
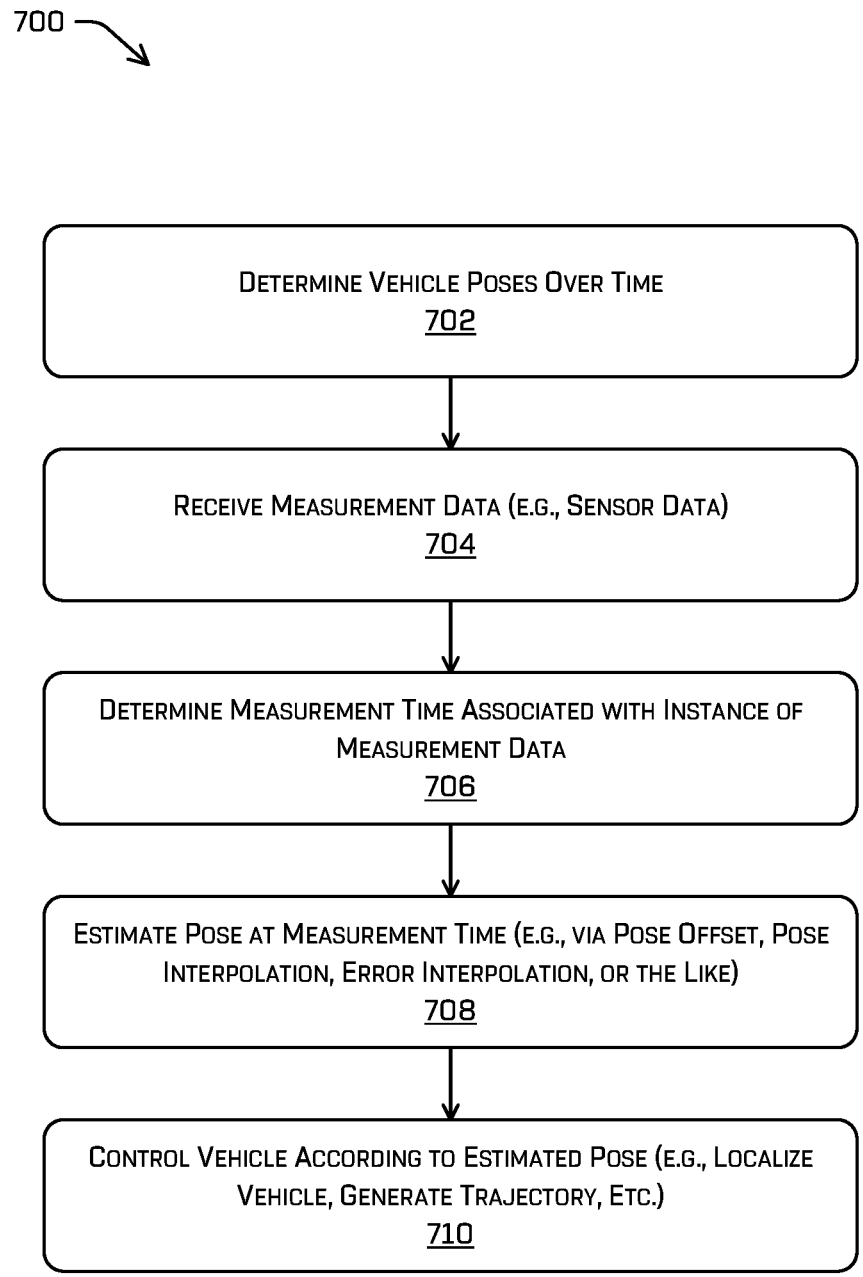
FIG. 7 is a flowchart illustrating an example method of controlling a vehicle based on an estimated pose, as described herein.

FIG. 7 (as well as FIGS. 1 and 3-5 discussed above) illustrates an example process in accordance with embodiments of the disclosure. The process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 7 depicts an example process 700 for controlling an autonomous vehicle using data estimation according to techniques detailed herein. For example, some or all of the process 700 can be performed by one or more components in FIG. 6, as described herein. Without limitation, some or all of the process 700 can be performed by the asynchronous data processing component 110.

At an operation 702, the process 700 includes determining vehicle poses over time. For example, the operation 702 includes determining vehicle poses for a vehicle at a predetermined frequency. The frequency may be a relatively low frequency, and the vehicle poses may be determined using data from a number of sensor and/or computing systems. The operation 702 can correspond to any of the operations 118, 302, 402, and/or 502.

At an operation 704, the process 700 includes receiving measurement data. For example, the measurement data may be sensor data, perception data, and/or other data measured and/or generated by a system, including one of the systems 202. In examples, the measurement data may be measured, generated, and/or received at a frequency different from the pose determinations. Moreover, the measurement data may be asynchronous relative to the pose determinations, e.g., the poses are generated at times different from the measurements.

At an operation 706, the process 700 includes determining a measurement time associated with an instance of the measurement data. As detailed herein, aspects of this disclosure may relate to estimating poses at times corresponding to measurement times. Without limitation, some implementations may include determining the pose of a vehicle at a time that data is measured. The operation 706 can correspond to any of the operations 124, 308, 408, and/or 508.

At an operation 708, the process 700 includes estimating a pose at the measurement time. As detailed herein, the pose estimation can be based on an offset of a single pose, e.g., as detailed in connection with FIG. 3. In another example, the pose estimation can be based on an interpolation of two or more pose determinations (e.g., from two or more of the vehicle poses determined at the operation 702. An example of pose interpolation is illustrated and described in connection with, FIG. 4. In yet another example, the pose estimation can be based at least in part on an interpolation of errors associated with the vehicle poses determined at the operation 702. FIG. 5 illustrates an example of pose error interpolation techniques according to aspects of this disclosure.

At an operation 710, the process 700 includes controlling a vehicle according to the estimated pose. The estimated pose can be used to perform functions associated with controlling the vehicle 102. For example, the estimated pose may be used to localize the vehicle, to generate a new trajectory for the vehicle, to correct previously-determined trajectories and/or vehicle location. In still further examples, the estimated pose may be input to one or more filters, which may be used to track the vehicle, control the vehicle, and/or the like.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: An example includes: an autonomous vehicle; a sensor on the autonomous vehicle generating sensor data at a first frequency; one or more processors; and one or more non-transitory computer readable media storing instructions executable by the one or more processors, wherein the instructions, when executed, cause the system to perform operations comprising: determining, based at least in part on the sensor data and at a second frequency, a plurality of poses of the autonomous vehicle, individual of the poses having an associated pose time; determining a measurement time associated with an instance of the sensor data; identifying a first pose of the plurality of poses having a first pose time before the measurement time and a second pose of the plurality of poses having a second pose time after the measurement time; determining a first pose error associated with the first pose and a second pose error associated with the second pose; and determining, based at least in part on an interpolation associated with the first pose error and the second pose error, an estimated pose of the autonomous vehicle at the measurement time.

B: The system of example A, wherein the interpolation associated with the first pose error and the second pose error comprises a linear interpolation between the first pose error and the second pose error, a cubic interpolation between the first pose error and the second pose error, or a spline interpolation associated with the first pose error and the second pose error.

C: The system of example A or example B, the operations further comprising: the estimated pose is based at least in part on an integration of the first pose to the measurement time.

D: The system of any one of example A through example C, wherein: the first pose is associated with a first local coordinate frame; the second pose is associated with a second local coordinate frame; and the first pose error and the second pose error are determined in a global coordinate frame different from the first local coordinate frame and the second local coordinate frame.

E: The system of any one of example A through example D, wherein the operations further comprise: re-solving the first pose and the second pose based at least in part on the instance of the sensor data and the estimated pose of the autonomous vehicle at the measurement time.

F: An example method includes: determining a first pose of an autonomous vehicle at a first pose time; determining a first pose error associated with the first pose; determining a second pose of the autonomous vehicle at a second pose time; determining a second pose error associated with the second pose; determining a measurement time associated with a measurement generated at the autonomous vehicle, the measurement time being after the first pose time and before the second pose time; and determining an estimated pose of the autonomous vehicle at the measurement time based at least in part on interpolating the first pose error and the second pose error.

G: The method of example F, wherein the interpolation is a linear interpolation between the first error and the second error.

H: The method of example F or example G, wherein: the first pose is in a first local coordinate system; the second pose is in a second local coordinate system; and the interpolating the first pose error and the second pose error comprises interpolating the first pose error and the second pose error in a global coordinate system different from the first local coordinate system and the second local coordinate system.

I: The method of any one of example F through example H, wherein the determining the estimated pose further comprises: extrapolating the estimated pose from the first pose or from the second pose.

J: The method of any one of example F through example I, wherein the extrapolating the estimated pose comprises: extrapolating the estimated pose from the first pose when the measurement time is closer to the first pose time than to the second pose time; or extrapolating the estimated pose from the second pose when the measurement time is closer to the second pose time than the first pose time.

K: The method of any one of example F through example J, further comprising: receiving data from an inertial measurement unit associated with at least one of the first pose time, the second pose time, or the measurement time, wherein the extrapolating the estimated pose is based at least in part on an integration of the first pose or the second pose using the data.

L: The method of any one of example F through example K, wherein the determining the estimated pose further comprises: generating an interpolation of the first pose and the second pose; and determining the estimated pose based on the interpolation.

M: The method of any one of example F through example L, wherein the interpolation comprises a linear interpolation between the first pose error and the second pose error, a cubic interpolation between the first pose error and the second pose error, or a spline interpolation associated with the first pose error and the second pose error.

N: The method of any one of example F through example M, further comprising: determining a smooth pose of the autonomous vehicle at the measurement time, wherein the estimated pose is based on the smooth pose and a linear interpolation of the first error and the second error.

O: The method of any one of example F through example N, wherein: the determining the first pose comprises solving for the first pose; and the determining the second pose comprises solving for the second pose, the method further comprising: re-solving, based at least in part on the measurement and the estimated pose at the measured time, for at least one of the first pose or the second pose.

P: One or more example non-transitory computer readable media storing instructions that, when executed by one or more processors, cause the processors to perform operations comprising: determining a first pose of an autonomous vehicle at a first pose time; determining a first pose error associated with the first pose; determining a second pose of the autonomous vehicle at a second pose time; determining a second pose error associated with the second pose; determining a measurement time associated with a measurement generated at the autonomous vehicle, the measurement time being after the first pose time and before the second pose time; and determining an estimated pose of the autonomous vehicle at the measurement time based at least in part on interpolating the first pose error and the second pose error.

Q: The one or more non-transitory computer readable media of example P, wherein: the first pose is in a first local coordinate system; the second pose is in a second local coordinate system; and the interpolating the first pose error and the second pose error comprises interpolating the first pose error and the second pose error in a global coordinate system different from the first local coordinate system and the second local coordinate system.

R: The one or more non-transitory computer readable media of example P or example Q, wherein the interpolation comprises a linear interpolation between the first pose error and the second pose error, a cubic interpolation between the first pose error and the second pose error, or a spline interpolation associated with the first pose error and the second pose error.

S: The non-transitory computer readable media of any one of example P through example R, wherein: the determining the first pose comprises solving for the first pose; the determining the second pose comprises solving for the second pose, the operations further comprising: re-solving, based at least in part on the measurement and the estimated pose at the measured time, for at least one of the first pose or the second pose.

T: The non-transitory computer readable media of any one of example P through example S, the operations further comprising: integrating the first pose to the measurement time.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
an autonomous vehicle;
a sensor on the autonomous vehicle generating sensor data at a first frequency;
one or more processors; and
one or more non-transitory computer readable media storing instructions executable by the one or more processors, wherein the instructions, when executed, cause the system to perform operations comprising:
determining, based at least in part on the sensor data and at a second frequency, a plurality of poses of the autonomous vehicle, individual of the poses having an associated pose time;
determining a measurement time associated with an instance of the sensor data;
identifying a first pose of the plurality of poses having a first pose time before the measurement time and a second pose of the plurality of poses having a second pose time after the measurement time;
determining a first pose error associated with the first pose and a second pose error associated with the second pose; and
determining, based at least in part on an interpolation associated with the first pose error and the second pose error, an estimated pose of the autonomous vehicle at the measurement time.

2. The system of claim 1, wherein the interpolation associated with the first pose error and the second pose error comprises a linear interpolation between the first pose error and the second pose error, a cubic interpolation between the first pose error and the second pose error, or a spline interpolation associated with the first pose error and the second pose error.

3. The system of claim 1, the operations further comprising:
the estimated pose is based at least in part on an integration of the first pose to the measurement time.

4. The system of claim 1, wherein:
the first pose is associated with a first local coordinate frame;
the second pose is associated with a second local coordinate frame; and
the first pose error and the second pose error are determined in a global coordinate frame different from the first local coordinate frame and the second local coordinate frame.

5. The system of claim 1, wherein the operations further comprise:
re-solving the first pose and the second pose based at least in part on the instance of the sensor data and the estimated pose of the autonomous vehicle at the measurement time.

6. A method comprising:
determining a first pose of an autonomous vehicle at a first pose time;
determining a first pose error associated with the first pose;
determining a second pose of the autonomous vehicle at a second pose time;
determining a second pose error associated with the second pose;
determining a measurement time associated with a measurement generated at the autonomous vehicle, the measurement time being after the first pose time and before the second pose time; and
determining an estimated pose of the autonomous vehicle at the measurement time based at least in part on interpolating the first pose error and the second pose error.

7. The method of claim 6, wherein the interpolation is a linear interpolation between the first error and the second error.

8. The method of claim 6, wherein:
the first pose is in a first local coordinate system;
the second pose is in a second local coordinate system; and
the interpolating the first pose error and the second pose error comprises interpolating the first pose error and the second pose error in a global coordinate system different from the first local coordinate system and the second local coordinate system.

9. The method of claim 6, wherein the determining the estimated pose further comprises:
extrapolating the estimated pose from the first pose or from the second pose.

10. The method of claim 9, wherein the extrapolating the estimated pose comprises:
extrapolating the estimated pose from the first pose when the measurement time is closer to the first pose time than to the second pose time; or
extrapolating the estimated pose from the second pose when the measurement time is closer to the second pose time than the first pose time.

11. The method of claim 9, further comprising:
receiving data from an inertial measurement unit associated with at least one of the first pose time, the second pose time, or the measurement time,
wherein the extrapolating the estimated pose is based at least in part on an integration of the first pose or the second pose using the data.

12. The method of claim 6, wherein the determining the estimated pose further comprises:
generating an interpolation of the first pose and the second pose; and
determining the estimated pose based on the interpolation.

13. The method of claim 6, wherein the interpolation comprises a linear interpolation between the first pose error and the second pose error, a cubic interpolation between the first pose error and the second pose error, or a spline interpolation associated with the first pose error and the second pose error.

14. The method of claim 6, further comprising:
determining a smooth pose of the autonomous vehicle at the measurement time,
wherein the estimated pose is based on the smooth pose and a linear interpolation of the first error and the second error.

15. The method of claim 6, wherein:
the determining the first pose comprises solving for the first pose; and
the determining the second pose comprises solving for the second pose, the method further comprising:
re-solving, based at least in part on the measurement and the estimated pose at the measured time, for at least one of the first pose or the second pose.

16. One or more non-transitory computer readable media storing instructions that, when executed by one or more processors, cause the processors to perform operations comprising:
  determining a first pose of an autonomous vehicle at a first pose time;
  determining a first pose error associated with the first pose;
  determining a second pose of the autonomous vehicle at a second pose time;
  determining a second pose error associated with the second pose;
  determining a measurement time associated with a measurement generated at the autonomous vehicle, the measurement time being after the first pose time and before the second pose time; and
  determining an estimated pose of the autonomous vehicle at the measurement time based at least in part on interpolating the first pose error and the second pose error.

17. The one or more non-transitory computer readable media of claim 16, wherein:
  the first pose is in a first local coordinate system;
  the second pose is in a second local coordinate system; and
  the interpolating the first pose error and the second pose error comprises interpolating the first pose error and the second pose error in a global coordinate system different from the first local coordinate system and the second local coordinate system.

18. The one or more non-transitory computer readable media of claim 16, wherein the interpolation comprises a linear interpolation between the first pose error and the second pose error, a cubic interpolation between the first pose error and the second pose error, or a spline interpolation associated with the first pose error and the second pose error.

19. The non-transitory computer readable media of claim 16, wherein:
  the determining the first pose comprises solving for the first pose; and
  the determining the second pose comprises solving for the second pose, the operations further comprising:
  re-solving, based at least in part on the measurement and the estimated pose at the measured time, for at least one of the first pose or the second pose.

20. The non-transitory computer readable media of claim 16, the operations further comprising:
  integrating the first pose to the measurement time.

* * * * *